Patented Dec. 8, 1931

1,835,697

UNITED STATES PATENT OFFICE

EMIR LOUIS D'ASTECK, OF MADRID, SPAIN, ASSIGNOR TO JOSEPH PEASE, OF SWALE, RICHMOND, ENGLAND, AND FRANK NEWELL, OF LONDON, ENGLAND

METHOD OF OXIDIZING AND NITRATING HEXAMETHYLENETETRAMINE AND THE PRODUCT

No Drawing. Application filed March 13, 1930, Serial No. 435,637, and in Great Britain September 20, 1929.

This invention consists in the production of a new organic compound one of whose properties is that of being highly explosive.

According to the invention the compound is produced by oxidizing hexamethylene tetramine with a solution of hydrogen peroxide, treating the resulting product with nitric acid, further oxidizing this product with hydrogen peroxide, and drying off the precipitate thus formed.

The oxidization and nitration of the hexamethylene tetramine may be effected as follows, the quantities taken depending on the concentrations of hydrogen peroxide:—

One part by weight of hexamethylene tetramine is dissolved in 3.77 parts by volume of hydrogen peroxide (30 vols.) viz., a 9 per cent solution of hydrogen peroxide in water. It is of importance that the concentration of the hydrogen peroxide be not less than 30 vols., for the reason that a weaker concentration has a prejudical effect on the yield of the final product.

The solution is kept well stirred, and nitric acid is added in small quantities at a time, until a copious white precipitate is thrown down. The specific gravity of the nitric acid may vary, but it is found that the best results are obtained by using acid of specific gravity 1.45 or upwards. The solution is kept well cooled and in no case is allowed to exceed 15° C.

When the precipitate is thrown down hydrogen peroxide (30 vols.) is again added to the solution until the precipitate is dissolved. The remarks as to the concentration of the hydrogen peroxide of the first addition apply equally to this second addition.

The whole solution is then covered hermetically so as to leave no air above it. For example there may be formed on the top of the solution a layer of an inert liquid of lower specific gravity than water, such as benzene, or a liquid of lower specific gravity than water which will not react chemically with the solution, such as methylated spirits. When methylated spirits are used, mixing occurs at the interface of the two layers, but as the solution is left to stand for about four hours only, such mixing has been found not to affect the yield. Alternatively, a piston or the like may be brought down on the top of the solution. This ensures the continuance of the reaction in the solution without undue loss of oxygen which it is very important to retain.

The solution becomes cloudy at the interface of the two liquids and after a few minutes a precipitate is slowly thrown down. On reaching the bottom of the vessel, bubbles of oxygen from the hydrogen peroxide become attached to the particles of the precipitate, and they are carired up to the interface of the two liquids where the oxygen bubbles are released and the particles again fall, thus establishing an up and down movement in the liquid which assists the rate of precipitation. After an hour or two the precipitation is practically complete.

The precipitate is filtered off and well washed with water until free from acid, and then dried. It is important to wash the precipitate otherwise there will be a tendency for the product to decompose as a result of the action of the residual acid. If desired the precipitate may be left with a moisture content which in view of the explosive nature of the dry product, would be an advantageous form in which to store or transport the said product. This precipitate is the new organic compound the preparation of which forms the subject of the invention.

I claim:—

1. The method of producing a new organic compound which consists in oxidizing hexamethylene tetramine with a solution of hydrogen peroxide treating the resulting product with nitric acid and further oxidizing this product with hydrogen peroxide which last step results in the formation of a precipitate.

2. The method according to claim 1 with the further step of drying off the precipitate formed.

3. The method according to claim 1 wherein the concentration of the hydrogen peroxide is 30 vols.

4. The method according to claim 1 wherein after the hexamethylene tetramine is dissolved in the hydrogen peroxide, the solution is well stirred and nitric acid added until a copious white precipitate is thrown down.

5. The method according to claim 1 wherein after the hexamethylene tetramine is dissolved in the hydrogen peroxide, the solution is well stirred and nitric acid added until a copious white precipitate is thrown down, the specific gravity of the acid being not less than 1.45.

6. The method according to claim 1 wherein the solution is maintained at a temperature not exceeding 15° C.

7. The method according to claim 1 wherein after the precipitate is thrown down by the addition of the nitric acid, hydrogen peroxide is again added until the precipitate is dissolved.

8. The method according to claim 1 wherein after the second addition of hydrogen peroxide the whole solution is covered hermetically so as to leave no air above it.

9. The method according to claim 1 wherein after the second addition of hydrogen peroxide the whole solution is covered hermetically so as to leave no air above it by forming on the top of the solution a layer of inert liquid of lower specific gravity than water.

10. The method according to claim 1 wherein after the second addition of hydrogen peroxide the whole solution is covered hermetically so as to leave no air above it by forming on the top of the solution a layer of benzene.

11. The method of producing a new organic compound which consists in dissolving one part by weight of hexamethylene tetramine in 3.77 parts by volume of hydrogen peroxide of not less than 30 volumes concentration, stirring the solution, adding nitric acid of specific gravity of upwards of 1.45 until a copious white precipitate is thrown down and maintaining the solution at a temperature not exceeding 15° C., adding more hydrogen peroxide of not less than 30 volumes concentration until the precipitate is dissolved, and covering the solution hermetically so as to leave no air above it, and filtering off and washing the resultant precipitate.

In witness whereof I have signed this specification.

EMIR LOUIS D'ASTECK.